United States Patent [19]
Capuano et al.

[11] 4,353,741
[45] Oct. 12, 1982

[54] SILVER COATED PARTICLES AND A PROCESS FOR PREPARING THEM

[75] Inventors: Italo A. Capuano, Orange; Lawrence P. Carr, Plantsville; Patricia A. Turley, Orange, all of Conn.

[73] Assignee: Olin Corporation, New Haven, Conn.

[21] Appl. No.: 134,386

[22] Filed: Mar. 27, 1980

Related U.S. Application Data

[63] Continuation-in-part of Ser. No. 19,795, Mar. 12, 1979, abandoned.

[51] Int. Cl.³ .................. B01J 21/18; C07D 301/04
[52] U.S. Cl. .................................. 75/109; 252/447; 252/463; 252/476; 427/217; 75/121; 549/534
[58] Field of Search ............... 427/217; 252/476, 463, 252/447; 98/84 M; 260/348.34; 75/109, 121

[56] References Cited
U.S. PATENT DOCUMENTS 4,126,582 11/1978 Diens .................................. 252/476
4,130,506 12/1978 Collier .................................. 252/476

Primary Examiner—Sam Silverberg
Attorney, Agent, or Firm—James B. Haglind; Donald F. Clements

[57] ABSTRACT

Silver coated particles having high concentrations of metallic silver are produced which are useful in forming alloys with metals such as mercury. The process comprises admixing carrier particles with an aqueous solution of a silver salt to form a slurry. A hydrazine compound is added to the slurry to precipitate metallic silver on the carrier particles in a medium which becomes increasingly acidic. Silver coated particles having a metallic silver content up to 90 percent by weight of the coated particle can be produced in a single impregnation under conditions which prevent the formation of explosive by-products such as silver nitride. The silver coated particles are particularly suitable for the recovery of metals such as mercury from fluids.

24 Claims, 7 Drawing Figures

SILVER COATED PARTICLES AND A PROCESS FOR PREPARING THEM

This application is a continuation-in-part of U.S. Ser. No. 19,795 filed Mar. 22, 1979 now abandoned.

This invention relates to metallic silver coated particles and a process for producing these particles which are useful in forming alloys with metals such as mercury.

The reduction of silver-containing solutions with hydrazine to form metallic silver is well known, for example, in the silvering of mirrors or the production of catalysts. Prior art processes react hydrazine or hydrazine salts with solutions of silver salts under basic conditions by the addition, for example, of alkali metal hydroxides, ammonium salts, or amines. As an acid is formed during the reduction of the silver salt, sufficient amounts of the base are present to neutralize the acid produced. These processes can safely produce lightweight or thin coatings of silver on various supports.

These processes, however, are not suitable for producing coatings having high concentrations (high loads) of silver, e.g. above about 25 percent by weight of Ag, in a single impregnation as the presence of a base other than hydrazine inhibits the deposit of large amounts of silver on the supports. Therefore, to achieve high loads, the process must be repeated several times. In addition, there is some reluctance to produce coated materials having high silver loads as these processes increase the danger of forming explosive by-products such as silver amide, silver imide, silver nitride or silver azide, making these processes inherently unsafe.

In addition, the reduction of silver salts with hydrazine under basic conditions results in a low concentrations of metallic silver being deposited on the support materials.

Where silver coated materials are used to form alloys with metals such as mercury, it is desirable for the materials to have high loads or heavy coatings of silver.

It is an object of the present invention to provide a process for producing silver coated particles having high loads of silver.

An additional object of the present invention is to provide a process for producing silver coated particles at high loading efficiencies.

Another object of the present invention is to provide a process for producing silver coated particles in the absence of basic conditions which promote the formation of explosive by-products.

A further object is to provide a process for producing silver coated particles having varying crystal habits.

A still further object of the present invention is to provide silver coated particles having high concentrations of metallic silver.

These and other objects of the present invention are provided by a process for producing silver coated particles which comprises:

(a) admixing carrier particles with an aqueous solution of silver salt to form a slurry, (b) adding a hydrazine compound to the slurry to deposit metallic silver on said carrier particles and thereby to form a reaction mixture of the resulting silver coated carrier particles in an acid medium having an increasing acidity as the silver is deposited, and (c) recovering the silver coated carrier particles from the reaction mixture.

More in detail, in preparing the novel silver coated particles of the present invention by the novel process of the present invention, one of the components of the slurry is a carrier, preferably in particulate form. Carriers which can be used to support the silver coatings are materials which are relatively inert to hydrazine compounds or aqueous solutions of silver compounds, are thermally stable and can be coated with silver. Suitable carriers include, for example, active carbon, wood, ceramic materials such as glass, brick, refractories, abrasives, and porcelain. Preferred as carriers are porous active carbon materials such as coconut carbon, wood, and charcoals.

Particularly preferred as a carrier for coatings having high concentrations of silver are coconut carbon particles. Coconut carbon has a highly active surface area which appears to promote the reduction of silver ions on the surface of the particle. This permits silver coated particles having high concentrations of silver to be produced in a single impregnation.

Carrier particle sizes in the range of from about 150 to about 11,000, and preferably from about 500 to about 3,400 microns are employed.

The carrier particles are admixed with an aqueous solution of a silver salt to form a slurry. Any water soluble silver salt may be used which is sufficiently soluble to provide concentrated solutions of silver ions. Suitable silver salts include, for example, silver nitrate, silver fluoride, silver metaborate, and silver silicofluoride, with silver nitrate being preferred.

Carrier particles are admixed with the aqueous silver salt solution in any suitable amounts. It is preferred that the amount of liquid be minimal, but sufficient so that the resulting slurry can be stirred or agitated.

A hydrazine compound is added to the solution containing silver ions and carrier particles to reduce the silver ions to metallic silver. Anhydrous hydrazine, aqueous solutions of hydrazine, and hydrazine compounds including alkyl hydrazines such as methyl hydrazine are suitable reactants.

Upon addition of the hydrazine compound to the slurry, the reaction between hydrazine and the silver ions take place rapidly and metallic silver deposits on the surface and in the pores of the carrier. For example, when hydrazine is added to a slurry containing silver nitrate, the reaction is believed to take place according to the following equation:

$$4AgNO_3 + H_2NNH_2 \rightarrow 4Ag^\circ + N_2 + 4NHO_3 \qquad (I)$$

Equation I shows that, as metallic silver is formed and deposited, nitric acid is also formed. Equation I further shows that a milliequivalent of nitric acid is produced for each milliequivalent of silver ion reduced. As the reaction mixture contains no additives to neutralize the acid formed, the concentration of free acid in the reaction mixture increases until all of the silver ions present have been reduced and deposited on the carrier particles. At this point, the reaction mixture is highly acidic, for example, having a pH of less that about 4, and preferably having a pH of less than about 2.

When producing silver coated particles having low concentrations of silver, an acid can be added to the reaction mixture, if necessary, to assure sufficient acidity.

Under the acidic conditions of the novel process of the present invention, metallic silver readily adheres to the carrier particles and loading efficiencies greater than 90% are readily attained.

Suitable reaction temperatures include, for example, those in the range of from about 0° to about 70° C. However, because of the formation of nitrogen oxides such as NO and NO₂ as by-products as the reaction temperatures increase, it is preferred to maintain reaction temperatures in the range of from about 0° C. to about 55° C., with those in the range of 15° to about 35° C. being particularly preferred.

In the acidic medium of the reaction mixture, the nature of the silver coating can be modified. Modifications in crystal habit are accomplished by changes in the reaction rate which is dependent, for example, on the reaction temperature and the rate of addition of the hydrazine compound. Changes in the reaction rate are believed to effect the rate of nucleation of silver crystals. At lower rates of reaction, for example, at reaction temperatures in the range of from about 0° to about 25° C., the silver coated particles produced have a lustrous metallic appearance with the coating being of a compact nature. These coated particles apparently have larger crystal faces with fewer individual crystals being present per unit weight of particles.

At higher reaction rates, for example, at reaction temperatures in the range of from about 25° to about 55° C., and preferably from about 25° to about 35° C., silver coated particles are produced having a nonlustrous powdery appearance and an apparently higher surface area suggesting smaller crystal faces and more individual crystals are present per unit weight of particles. Coated particles of either type or mixture of the two types can be produced having high concentrations of silver.

It is advantageous during the initial period of the reacton to control the rate of addition of the hydrazine compound to maintain, for example, the temperature of the reaction mixture within the ranges described above. From the start of the reaction, for example, up until about one third of the total amount of hydrazine compound to be used has been added, the rate of hydrazine addition is controlled to maintain the reaction mixture at the desired temperatures. As the reaction proceeds, the rate of hydrazine addition may be increased, for example, to several times that which is used during the initial reaction period.

Referring to the reaction in Equation I above, as the amount of hydrazine added to the reaction mixture approaches the stoichiometric amount, there is the possibility that metallic silver may be redissolved off the coated particles by the nitric acid formed. Redissolution of silver can be minimized by rapidly removing the coated particles from the solution. A preferred way of preventing loss of silver is by employing an excess of the hydrazine compound which is sufficient to redeposit any redissolved silver and to react, for example, with nitric acid according to the equation:

$$HNO_3 + H_2NNH_2 \rightarrow H_2NNH_3NO_3 \quad (II)$$

The amount of excess hydrazine compound added is not critical and any suitable amount may be used. For example, an excess of hydrazine compound which will provide the reaction mixture with a concentration of up to 10 percent by weight of a hydrazinium salt and such as hydrazinium nitrate will efficiently prevent redissolving the metallic silver. After the deposition of metallic silver has been completed, the addition of other neutralizing agents which are also reducing agents for silver ions such as hydroxylamine may be used in conjunction with an excess of the hydrazine compound.

The silver coated particles produced by the process of the present invention are removed from the reaction mixture, washed with a solvent such as water, and dried by known methods. During the drying of the silver coated particles, there is no danger of an explosion as expolsive by-products such as silver nitride are not formed under the acidic conditions of the process of the present invention.

Where an excess of hydrazine compound is used and a product such as hydrazinium nitrate is formed, the solution may be safely disposed of by treating it with an oxidizing agent. Suitable oxidizing agents include, for example, an alkali metal hypochlorite or alkaline earth metal hypochlorite which will reduce the hydrazine to nitrogen. The reaction between hydrazinium nitrate and, for example, calcium hypochlorite is believed to proceed according to the following equation:

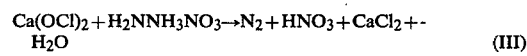

$$Ca(OCl)_2 + H_2NNH_3NO_3 \rightarrow N_2 + HNO_3 + CaCl_2 + H_2O \quad (III)$$

To neutralize the acid produced, a basic compound such as sodium hydroxide is admixed with the hypochlorite to form an effluent solution which may be disposed of by known procedures.

Silver may be recovered, for example, from spent silver coated carbon particles by heating the particles in air to temperatures of about 800° C. where the carbon is oxidized to carbon dioxide. The pure silver metal remaining may be treated, for example, with nitric acid to produce silver nitrate by conventional methods and the silver nitrate reused in producing additional silver coated particles.

It should be understood that while hydrazine compounds are preferred reducing agents in the process of the present invention, other basic reducing agents may be employed, for example, hydroxylamine.

The novel process of the present invention produces silver coated particles having high contents of metallic silver in the absence of ammonia, buffering agents for complexing agents required in the processes of the prior art.

The novel process of the present invention produces silver coated particles having high concentrations of metallic silver. Particles having metallic silver contents in the range of from about 2 to about 90 percent of the weight of the coated particle may be prepared. However, the process is particularly suitable for the production of silver coated particles containing silver in amounts of from about 20 to about 80, and more preferably from about 30 to about 70 percent by weight of the coated particle. The process produces metallic silver in forms which are readily deposited on the carrier particle with low amounts of undeposited silver. The high silver concentrations are obtained in a single impregnation and the process does not have to be repeated as is the case with previously known processes. In addition, the process is safe as dangerously explosive by-products such a silver nitride (silver azide) are not produced.

The novel silver coated particles of the present invention are illustrated by accompanying FIGS. 1-8. These Figures present photomicrographs magnified 500 times of several embodiments of the silver coated particles of the present invention taken by a scanning micron electroscope. The carrier particle in each embodiment is coconut carbon having a particle size in the range of 6 to 14 U.S. Standard mesh.

Figure 1:
FIG. 1 illustrates the powdery surface of silver coated particles having a 70 percent silver load.
Figure 2:
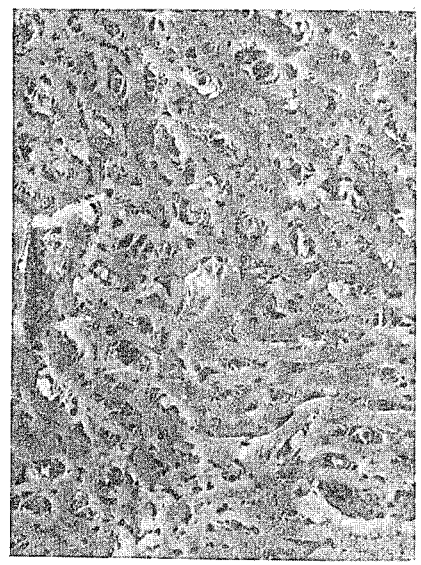
FIG. 2 shows a planar cross section of silver coated particles of FIG. 1 in which a large degree of the porosity of the carbon carrier is retained.
Figure 3:
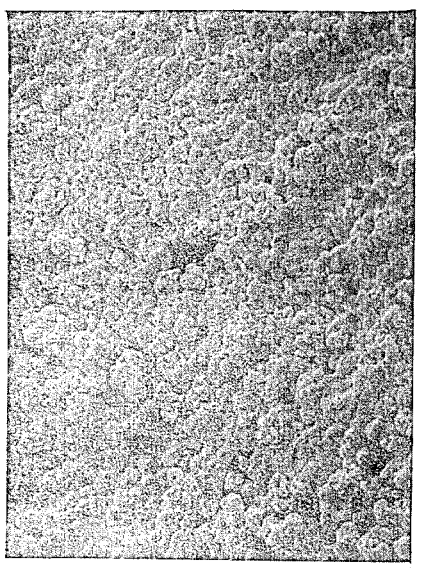
FIG. 3 depicts the granular surface having high intergranular porosity of silver coated particles having a 50 percent silver load.
Figure 4:
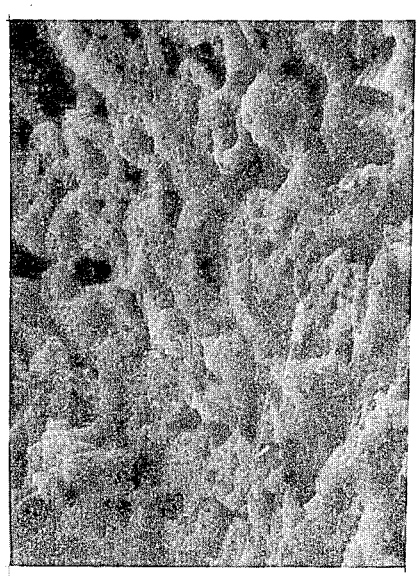

A planar cross section of the silver coated particles of FIG. 3 is illustrated in FIG. 4 in which the ridged surface of the carbon carrier shows reduced porosity.

Figure 5:
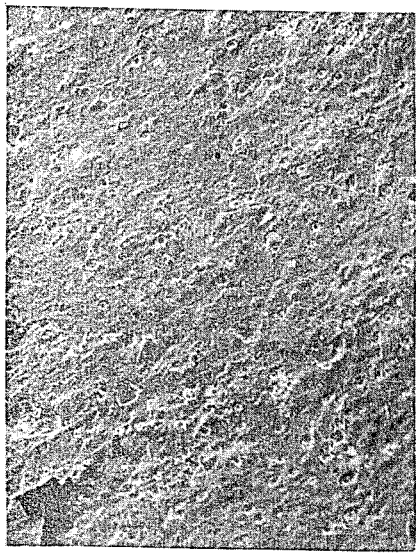

FIG. 5 shows the smooth metallic-like surface of silver coated particles having a 40 percent silver load.

Figure 6:
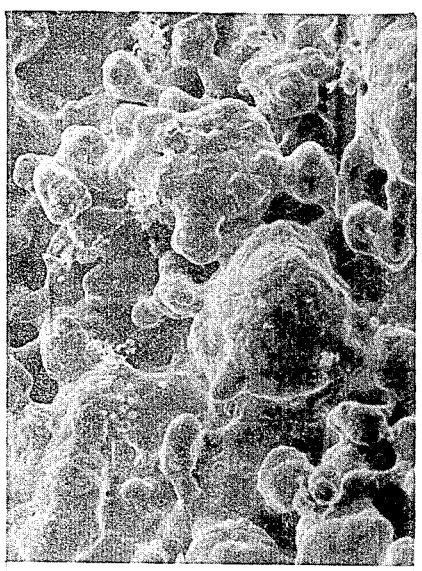
Figure 7:
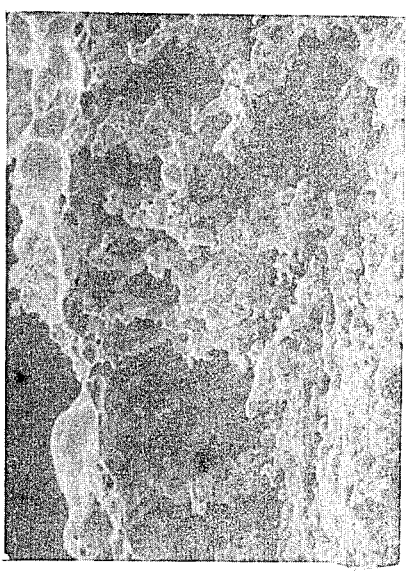

In the embodiment depicted in FIGS. 6 and 7, the particles of FIG. 5 has been pyrolyzed at 800° C. to remove the carbon. The surface (FIG. 6) and particularly the cross section (FIG. 7) portray a spongy, channelled type of formation which indicates the silver metal has significantly penetrated the pores of the carrier to form a self supported structure.

Figure 8:
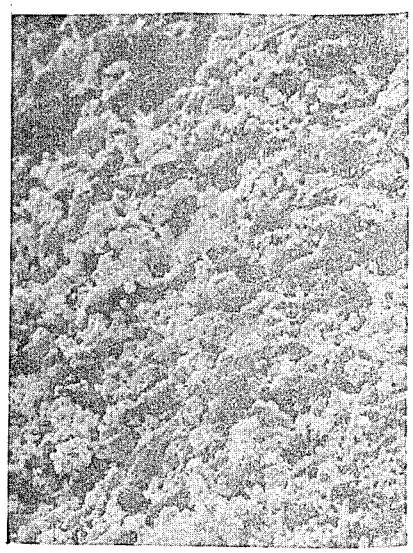

FIG. 8 illustrates the powdery, flaky surface of the silver coated particles having a 10 percent silver load.

The silver coated particles of the present invention have extensive surface area which is coated with silver to a depth which permits the coted particles to dissolve metals such as mercury to form an amalgam. These particles can be used, for example, to remove mercury from fluids in which it is a contaminant. They may be employed with any mercury-containing liquid which does not substantially interfere with the formation of silver amalgam. For example, slightly acidic, neutral, or alkaline liquids containing metallic mercury can be treated to produce liquids containing metallic mercury concentrations of less than about 200 and preferably less than about 50 parts per billion. The silver coated particles of the present invention may be employed in suitably treating solutions of compounds such as alkali metal or alkaline earth metal alcoholates, alkali metal or alkaline earth metal hydroxides and alkali metal hydrosulfites. These liquids have a pH of about 5 or higher, preferably about 6.5 or higher. Strong solutions of alkalies such as alkali metal hydroxides having a concentration of, for example, 50 percent by weight or greater of the alkali metal hydroxide may be suitably treated. For organic liquids or solutions in which the solvent is an organic compound, the acidity or alkalinity is that which is equivalent to aqueous solutions having a pH of about 5 or higher. The acidity or alkalinity is normally determined by procedures such as titrations. For example, a solution of 25 percent by weight of sodium methylate in methanol has a total alkali content of about 4.63 equivalents of a base such as sodium hydroxide per liter of solution.

The silver coated particles of the present invention having high concentrations of metallic silver are superior when employed in mercury recovery processes as lower amounts are required to amalgamate equivalent quantitites of mercury than when using commercially available silver catalysts. Also the silver coated particles of the present invention require less frequent regeneration.

The novel silver coated particles of the present invention may also be used as catalysts in the direct oxidation of alkylene hydrocarbons, such as ethylene or propylene, with molecular oxygen to produce an alkylene oxide. The silver coated particles may be employed as such or in the silver oxide form. The conditions for carrying out such an oxidation reaction in the presence of the silver coated particle of the present invention broadly comprise those described in the prior art. This applies, for example, to suitable temperatures, pressures, residence times, diluent materials, such as nitrogen, carbon dioxide, steam, argon, methane or other saturated hydrocarbons, presence or absence of moderating agents to control the catalytic action, for example, 1,2-dichloroethane, vinyl chloride or chlorinated polyphenyl compounds, the desirability of employing recycle operations or applying successive conversion in different reactors to increase the yields of alkylene oxide, and any other special conditions which may be selected in processes for preparing alkylene oxide. Pressures in the range of from about atmospheric to about 35 atm are generally employed. Higher pressures may, however, be employed within the scope of the invention. Molecular oxygen employed as reactant is obtained from conventional sources. The suitable oxygen charge may consist essentially of relatively pure oxygen. A concentrated oxygen stream comprising oxygen in major amount with lesser amounts of one or more diluents such as nitrogen, argon, etc., or another oxygen-containing stream such as air. It is therefore evident that the use of the present novel silver coated particles in alkylene oxidation reactions is in no way limited to the use of specific conditions among those which are known to be effective.

To further illustrate the process and composition of the present invention, the following Examples are presented. All percentages are by weight unless otherwise specified.

EXAMPLE 1

Activated cocoanut carbon particles (40 grams, size range 1400 to 3400 microns) were added to a jacketed reaction vessel containing 130 milliliters of an aqueous solution containing 94.5 grams of $AgNO_3$ and having a pH of from 6 to 7. The reaction vessel was equipped with an agitator which was turned on to thoroughly mix the carbon particles with the silver nitrate solution. An aqueous solution containing 26 percent by weight of hydrazine was added to the reaction vessel at an initial rate of about 0.5–2.0 milliliters per minute. Cooling water was circulated through the jacket to maintain the reaction temperature in the range of 15°–30° C. With continued addition of the hydrazine solution, the acidity of the reaction mixture increased until about 560 milliequivalents of acid had been formed. Further addition of hydrazine solution resulted in a decrease in acidity and indicated the solution was depleted of silver ion. During the reaction, a total of 78.4 milliliters of the hydrazine solution were added, the rate of addition being gradually increased to 3–12 milliliters per minute. Silver coated carbon particles were removed from the reaction mixture and washed with water and dried in an oven at 120° C. The silver coated carbon particles weighed 98.9 grams. A residue of carbon particles and metallic silver particles (2.1 grams) was also recovered from the reaction mixture. The coated particles had a silver concentration of 59.34 percent by weight of the particles. Of the total available silver, 98.2 percent was deposited from the solution onto the charcoal particles. Following recovery of the silver coated particles, the reaction liquor was treated with 800 milliliters of a 5 percent calcium hypochlorite solution containing 5 grams of NaOH to decompose any hydrazinium nitrate and hydrazine which was present.

COMPARATIVE EXAMPLE A

Silver nitrate (42.5 g) was dissolved in 80 mls. of water and the solution (pH 5.6) added to a reaction vessel equipped with a stirring device. Activated coconut carbon particles (40 grams) were added to the reaction vessel. NaOH pellets (16 g.) were admixed with 8.5 g of a 35% aqueous solution of hydrazine and 50 mls. of water to form a caustic-hydrazine solution. This solution was gradually added to the carbon-$AgNO_3$ reaction mixture over a period of 26 minutes. During this reaction period, the temperature rose from 22° to 44° C. and the pH increased to 10. From the reaction mixture, 41 grams of silver coated particles were recovered along with 19.3 of the silver powder. Of the total available silver, only 3.7 percent was deposited on the carbon particles.

The procedure employed in Example 1 resulted in depositing 98.2 percent of the total available silver onto the carbon particles in comparison with the 3.7 percent obtained in Comparative Example A in which sodium hydroxide was present in the reaction mixture. The absence of bases such as sodium hydroxide is thus shown to significantly increase metallic silver deposition on the carrier particles.

EXAMPLE 2-7

The procedure of Example 1 was repeated to produce silver coated carbon particles having varying concentrations of metallic silver deposited on them. The amounts of hydrazine solution (26%), silver nitrate, and carbon used along with the percent by weight of silver of the coated particles and the reaction temperature for Examples 2–7 are recorded in Table 1 below.

TABLE 1

| Example No. | ml 26% $N_2H_4$ | Wt. of Carbon gms | Wt. of $AgNO_3$ gms | Actual % Ag Load | Reaction Temp. °C. |
|---|---|---|---|---|---|
| 2 | 13.0 | 90 | 15.7 | 8.19 | 17.1 |
| 3 | 26.1 | 80 | 31.5 | 15.89 | 24.0 |
| 4 | 39.2 | 70 | 47.2 | 26.44 | 30.1 |
| 5 | 65.3 | 50 | 78.7 | 48.14 | 29.3 |
| 6 | 78.4 | 40 | 94.5 | 57.87 | 28.0 |
| 7 | 105 | 20 | 126 | 68.50 | 32.4 |

Examples 2–7 illustrate the wide range of amounts of silver which can be deposited on carrier particles during a single stage reaction by the process of the present invention.

EXAMPLES 8-15

Silver coated carbon particles were prepared by the procedure of Example 1 in which activated coconut carbon particles (size range: 1400 to 3400 microns) were dried and then slurried in an aqueous solution of $AgNO_3$. Aqueous hydrazne solution (26 percent $N_2H_4$) was reacted with the slurry to produce silver coated carbon particles having silver loads in the range of 34–39 percent by weight of Ag. The amounts of carbon, silver nitrate solution, and silver coated carbon particles produced, along with the percent of Ag loading and the percent of efficiency for each of the Examples is given in Table 2.

TABLE 2

| Example No. | Wt. of Carbon gms | Wt. of $AgNO_3$ gms | Wt. of Ag Coated Carbon | % Ag Loaded | % Efficiency* |
|---|---|---|---|---|---|
| 8 | 990 | 1040 | 1528 | 35.2 | 92.6 |
| 9 | 990 | 1040 | 1624 | 39.0 | 98.4 |
| 10 | 1320 | 1386 | 2016 | 34.5 | 91.6 |
| 11 | 1320 | 1386 | 2004 | 34.1 | 91.1 |
| 12 | 1320 | 1386 | 2003 | 34.1 | 91.0 |
| 13 | 1320 | 1386 | 2047 | 35.5 | 93.0 |
| 14 | 1320 | 1386 | 2021 | 34.7 | 91.9 |
| 15 | 1320 | 1386 | 2039 | 35.3 | 92.6 |

*Efficiency determined from gravimetric analysis (increase in the weight of carbon support after silvering and drying). These Examples illustrate the high efficiencies which are consistently accomplished employing the process of the present invention.

EXAMPLE 16

Silver nitrate (8.316 kgs.) was dissolved in water and the solution added to a jacketed reaction vessel. Coconut carbon particles (7.92 kgs., 1400–3400 microns) were added to the reaction vessel and the slurry cooled to 14° C. An aqueous hydrazine solution (6.888 liters at 26% by weight of $N_2H_4$) was fed to the stirred slurry, initially at a rate of 25 milliliters per minute to reduce silver ions to metallic silver. The pH of the reaction slurry was initially at about 7 and became increasingly acidic as the deposition of silver metal continued. After about 50 minutes, the rate of addition of the hydrazine solution was increased to about 30 milliliters per minute and the rate of addition gradually increased to about 138 milliliters per minute. During the reaction period, the temperature was maintained in the range of 14°–19° C. After the depletion of silver ion from the solution (pH=0), excess hydrazine was fed to the reaction mixture to neutralize nitric acid present and raise the pH of the solution to about 7.0. The silver coated particles recovered from the reaction mixture were washed with water and air dried. The surface of the coated particles has a shiny metallic appearance of the type illustrated in FIG. 5 and a silver load of 40 percent by weight of Ag.

EXAMPLE 17

Silver coated carbon particles were prepared by the process of Example 16 having a metallic silver content of 40 percent by weight of the coated particle. A column (1.25×32 inches) was packed with 400 grams of the silver particles. Sodium methylate solutions containing varying amounts of mercury were passed through the column over an eight day period. The temperature of the solution was in the range of 45°–50° C. and the solution was fed to the column at a space velocity of 6.8 to 7.5 per hour. The space velocity is defined as the feed rate of the liquid per unit of volume of silver coated particles. Mercury removal from the methylate solution is shown in Table 3 below.

TABLE 3

| | Total mercury, ppm in | |
|---|---|---|
| Day | $NaOCH_3$ fed to column | $NaOCH_3$ exiting column |
| 1 | 2.99 | 0.022 |
| 2 | 8.78 | 0.028 |
| 5 | 3.19; 11.6 | 0.022; 0.026 |
| 6 | 5.70; 1.18 | 0.043; 0.021 |
| 7 | 1.71; 4.20 | 0.016; 0.019 |
| 8 | 12.8 | 0.035 |

This example shows the high efficiency of mercury removal obtained with silver coated particles produced by the process of the present invention.

What is claimed is:

1. A process for producing silver coated particles which comprises:
   (a) admixing active carbon carrier particles with an aqueous solution of a silver salt to form a slurry consisting of said active carbon carrier particles in said aqueous solution of the silver salt;
   (b) adding a reducing agent consisting of a hydrogen compound to said slurry to deposit metallic silver on said active carbon carrier particles and therby form a reaction mixture of the resulting silver coated active carbon carrier particles in an acid medium having an increasing acidity as said silver is deposited, at the conclusion of said silver deposition, said reaction mixture having a pH of less than about 4; and
   (c) recovering said silver coated particles from said reaction mixture.

2. The process of claim 1 in which said hydrazine compound is selected from the group consisting of anhydrous hydrazine, aqueous solutions of hydrazine, hydrazine salts, and alkyl hydrazines.

3. The process of claim 2 in which said reaction mixture is maintained at a temperature in the range at from about 0° to about 55° C.

4. The process of claim 3 in which said silver coated particles have a metallic silver content of from about 2 to about 90 percent by weight of the coated particles.

5. The process of claim 4 in which said silver salt is selected from the group consisting of silver nitrate, silver fluoride, silver metaborate, and silver silicofluoride.

6. The process of claim 5 in which said carrier is an active carbon material selected from the group consisting of coconut carbon, wood and charcoals.

7. the process of claim 6 in which said silver coated particles have a silver content of from about 25 to about 80 percent by weight of the coated particles.

8. The process of claim 7 in which said hydrazine compound is an aqueous solution of hydrazine.

9. The process of claim 8 in which said silver salt is silver nitrate.

10. The process of claim 9 in which said carrier particles are coconut carbon.

11. the process of claim 10 in which sad silver coated particles have silver content of from about 30 to about 70 percent by weight of the coated particles.

12. A process for producing silver coated particles having a high content of metallic silver which comprises:
   (a) mixing particles of porous active carbon with an aqueous solution of silver nitrate to form a slurry consisting of said particles of porous active carbon in an aqueous solution of silver nitrate;
   (b) adding a reducing agent consisting of a hydrazine compound to said slurry to deposit metallic silver on the surface and in the pores of said porous active carbon particles and thereby to form an acid reaction mixture of the resulting silver coated carrier particles and nitric acid, said reaction mixture having an increasing concentration of nitric acid as said silver is deposited, at the conclusion of said silver deposition, said reaction mixture having a pH of less than about 4, said silver coated particles having a metallic silver content in the range of from about 30 to about 70 percent by weight of the coated particle; and
   (c) recovering said coated particles from said reaction mixture.

13. The process of claim 12 in which the temperature of said reaction mixture is maintained in the range of from about 0° to about 55° C.

14. The process of claim 13 in which said hydrazine compound is an aqueous solution of hydrazine.

15. The process of claim 14 in which said active carbon is coconut carbon.

16. The process of claim 1 or 2 in which, at the conclusion of said silver deposition, an excess of hydrazine is employed to neutralize said reaction mixture.

17. A process for producing silver coated particles which comprises:
   (a) admixing carrier particles with an aqueous solution of an ionic silver salt to form a slurry consisting of said carrier particles in said aqueous solution of an ionic silver salt;
   (b) adding a reducing agent consisting of a hydrazine compound to said slurry to reduce said ionic silver to metallic silver while forming an acidic reaction mixture which increases the acidity of said slurry, said rate of addition of said hydrazine compound being controlled to maintain the reaction mixture within the desired temperature range;
   (c) depositing said metallic silver on said carrier particles;
   (d) continuing said hydrazine addition until the slurry is substantially depleted of silver ions and said slurry is highly acidic, the pH of said slurry being less than about 4;
   (e) adding a neutralizing agent to said slurry to form a neutralized slurry; and
   (f) recovering said silver coated particles from said neutralized slurry.

18. The process of claim 17 in which following step (f), said neutralized liquor is treated with an oxidizing agent selected from the group consisting of alkali metal hypochlorites and alkaline earth metal hypochlorites.

19. A process for the recovery of metallic mercury from a mercury-containing liquid having a pH of about 5 or higher which comprises:
   (a) producing silver particles by the process of claim 7,
   (b) contacting said mercury-containing liquid with said silver coated particles to dissolve said mercury in said silver coated particles to form a silver amalgam,
   (c) recovering a purified liquid containing less than about 200 parts per billion of metallic mercury.

20. The process of claim 19 in which said mercury-containing liquid is selected from the group consisting of solutions of alkali metal hydroxides, alkaline earth metal hydroxides, alkali metal alkoxides, alkaline earth metal alkoxides, and alkali metal hydrosulfites.

21. The process of claim 2 in which said mercury-containing liquid is sodium methylate.

22. In a process for the oxidation of alkylene hydrocarbons in the presence of a silver catalyst to produce alkylene oxides, the improvement which comprises producing silver particles by the process of claim 12 and employing said silver particles as said silver catalyst.

23. The process of claim 11 or 12 in which the temperature of said reaction mixture is maintained in the range of from about 0° to about 25° C.

24. The process of claim 11 or 12 in which said temperature of said reaction mixture is maintained in the range of from about 25° C. to about 35° C.

* * * * *

UNITED STATES PATENT AND TRADEMARK OFFICE
CERTIFICATE OF CORRECTION

PATENT NO. : 4,353,741

DATED : October 12, 1982

INVENTOR(S) : Italo A. Capuano, Lawrence P. Carr, and Patricia A. Turley

It is certified that error appears in the above-identified patent and that said Letters Patent is hereby corrected as shown below:

Column 5, line 27, delete "coted" and insert --coated--.

Column 6, EXAMPLE 1, line 37, delete "cocoanut" and insert --coconut--.

Column 7, line 30, delete "EXAMPLE" and insert --EXAMPLES--.

Column 7, EXAMPLES 8-15, line 61, after "Aqueous" delete "hydrazne" and insert --hydrazine--.

Column 8, EXAMPLE 16, line 39, delete "has" and insert --have--.

Column 9, Claim 1, line 13, delete "therby" and insert --thereby--.

Column 9, Claim 7, line 39, delete "the" and insert --The--.

Column 9, Claim 11, line 48, delete "the" and insert --The-- and delete "sad" and insert --said--.

Signed and Sealed this

Nineteenth Day of April 1983

[SEAL]

Attest:

GERALD J. MOSSINGHOFF

*Attesting Officer*  *Commissioner of Patents and Trademarks*